US009582389B2

(12) United States Patent
Dain (10) Patent No.: US 9,582,389 B2
(45) Date of Patent: Feb. 28, 2017

(54) AUTOMATED VERIFICATION OF APPLIANCE PROCEDURES (71) Applicant: INTERNATIONAL BUSINESS MACHINES CORPORATION, Armonk, NY (US)

(72) Inventor: Joseph W. Dain, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 13/938,514

(22) Filed: Jul. 10, 2013

(65) Prior Publication Data
US 2015/0020050 A1 Jan. 15, 2015

(51) Int. Cl.
G06F 9/44 (2006.01)
G06F 11/263 (2006.01)
G06F 11/36 (2006.01)

(52) U.S. Cl.
CPC .. *G06F 11/263* (2013.01); *G05B 2219/13142* (2013.01); *G06F 8/71* (2013.01); *G06F 11/362* (2013.01); *G06F 11/3664* (2013.01); *G06F 11/3672* (2013.01)

(58) Field of Classification Search
CPC ...... G06F 11/3672; G06F 11/362; G06F 8/71; G06F 11/3664; G05B 2219/13142
See application file for complete search history.

(56) References Cited

U.S. PATENT DOCUMENTS

| 5,051,938 | A  | * | 9/1991  | Hyduke ........... G01R 31/31835 702/117 |
| 5,655,148 | A  | * | 8/1997  | Richman et al. ................. 710/8 |
| 6,345,294 | B1 | * | 2/2002  | O'Toole et al. .............. 709/222 |
| 6,678,354 | B1 | * | 1/2004  | Blue ......................... 379/10.01 |
| 6,704,864 | B1 | * | 3/2004  | Philyaw ........................ 713/1 |
| 6,754,817 | B2 | * | 6/2004  | Khatri et al. .................... 713/1 |
| 7,181,382 | B2 | * | 2/2007  | Shier et al. ..................... 703/13 |
| 7,430,154 | B2 | * | 9/2008  | Pratt et al. ................. 369/30.27 |
| 7,814,465 | B2 | * | 10/2010 | Liu ..................... G06F 9/44589 717/124 |
| 8,146,060 | B2 |   | 3/2012  | Lekel |
| 8,156,213 | B1 | * | 4/2012  | Deng .................... H04L 41/084 709/223 |
| 8,387,010 | B2 | * | 2/2013  | Hashimoto ............... G06F 8/36 717/101 |

(Continued)

OTHER PUBLICATIONS

Naoki Yamauchi et al., Home Appliance Virtualization Software Configuration for Home Network Services, IEEE, 2010, retrieved online on Oct. 5, 2016, pp. 26-31. Retrieved from the Internet: <URL: http://ieeexplore.ieee.org/stamp/stamp.jsp?arnumber=5614910>.*

(Continued)

*Primary Examiner* — Thuy Dao
*Assistant Examiner* — Hanh T Bui
(74) *Attorney, Agent, or Firm* — Griffiths & Seaton PLLC (IBM)

(57) ABSTRACT

For automated verification of appliance procedures using a processor device in a computing environment, a testing configuration is dynamically configured for automatically testing software by adding and/or removing at least one application device from one of the testing configurations for creating a plurality of appliance configurations.

12 Claims, 5 Drawing Sheets

(56) References Cited

U.S. PATENT DOCUMENTS

| | | | |
|---|---|---|---|
| 8,413,118 B2* | 4/2013 | Kodosky | G06F 3/04817 715/740 |
| 8,539,448 B2* | 9/2013 | Neupartl et al. | 717/124 |
| 9,104,997 B1* | 8/2015 | Balasubramanian | G06Q 10/06 |
| 2003/0236644 A1* | 12/2003 | Lara et al. | 702/121 |
| 2004/0039969 A1* | 2/2004 | Pratt | G11B 19/10 714/42 |
| 2004/0054492 A1* | 3/2004 | Hagerott et al. | 702/120 |
| 2004/0266423 A1* | 12/2004 | Morikawa | H04W 24/00 455/424 |
| 2005/0015702 A1* | 1/2005 | Shier et al. | 714/776 |
| 2006/0212540 A1* | 9/2006 | Chon et al. | 709/218 |
| 2007/0105538 A1* | 5/2007 | Hassan et al. | 455/418 |
| 2007/0156864 A1* | 7/2007 | McCoy et al. | 709/222 |
| 2007/0266373 A1* | 11/2007 | Liu | G06F 9/44589 717/126 |
| 2007/0299650 A1* | 12/2007 | Tamayo et al. | 703/27 |
| 2008/0086720 A1* | 4/2008 | Lekel | 717/124 |
| 2009/0006023 A1* | 1/2009 | Tiegs | 702/122 |
| 2009/0217243 A1* | 8/2009 | Hashimoto | G06F 8/36 717/120 |
| 2009/0232020 A1* | 9/2009 | Baalbergen et al. | 370/254 |
| 2009/0276201 A1* | 11/2009 | Maan et al. | 703/13 |
| 2009/0306954 A1* | 12/2009 | Lee et al. | 703/21 |
| 2013/0078983 A1* | 3/2013 | Doshi et al. | 455/418 |
| 2013/0111268 A1* | 5/2013 | Gong et al. | 714/32 |
| 2013/0305222 A1* | 11/2013 | Cinar et al. | 717/124 |

OTHER PUBLICATIONS

Dongpu Jin et al., PrefFinder: Getting the Right Preference in Configurable Software Systems, ACM, 2014, retrieved online on Oct. 5, 2016, pp. 151-162. Retrieved from the Internet<URL: http://delivery.acm.org/10.1145/2650000/2643009/p151-jin.pdf?>.*

* cited by examiner

AUTOMATED VERIFICATION OF APPLIANCE PROCEDURES

BACKGROUND OF THE INVENTION

Field of the Invention

The present invention relates in general to computers, and more particularly to automated verification of appliance procedures in a computing environment.

Description of the Related Art

In today's society, computer systems are commonplace. Computer systems may be found in the workplace, at home, or at school. These computer system may also be referred to as and/or include computer appliances which are generally a separate and discrete hardware device with integrated software (firmware), specifically designed to provide a specific computing resource. These devices became known as "appliances" because of their similarity to home appliances, which are generally "closed and sealed"—not serviceable by the owner. The hardware and software are pre-integrated and pre-configured before delivery to customer, to provide a "turn-key" solution to a particular problem. Unlike general-purpose computers, appliances are generally not designed to allow the customers to change the software (including the underlying operation system), or to flexibly reconfigure the hardware. By tightly constraining the variations of the hardware and software, the appliance becomes easily deployable, and can be used without nearly as wide (or deep) IT knowledge. However, there is a need for increased efficiency for insuring the hardware and software are properly configured without human intervention.

SUMMARY OF THE DESCRIBED EMBODIMENTS

In one embodiment, a method is provided for automated verification of appliance procedures in a purpose built backup appliance (PBBA) using a processor device in a computing environment. In one embodiment, by way of example only, a testing configuration is dynamically configured for automatically testing software by adding and/or removing at least one application device from one of the testing configurations for creating a plurality of appliance configurations.

In another embodiment, a computer system is provided for automated verification of appliance procedures in a purpose built backup appliance (PBBA) using a processor device, in a computing environment. The computer system includes a computer-readable medium and a processor in operable communication with the computer-readable medium. In one embodiment, by way of example only, the processor dynamically configures a testing configuration for automatically testing software by adding and/or removing at least one application device from one of the testing configurations for creating a plurality of appliance configurations.

In a further embodiment, a computer program product is provided for automated verification of appliance procedures in a purpose built backup appliance (PBBA) using a processor device, in a computing environment. The computer-readable storage medium has computer-readable program code portions stored thereon. The computer-readable program code portions include a first executable portion that dynamically configures a testing configuration for automatically testing software by adding and/or removing at least one application device from one of the testing configurations for creating a plurality of appliance configurations.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned above, by tightly constraining the variations of the hardware and software, an appliance becomes easily deployable, and can be used without nearly as wide (or deep) IT knowledge. However, there is a need for increased efficiency for insuring the hardware and software are properly configured without human intervention. In one embodiment, software applications run on top of a general-purpose operation system, which uses the hardware resources of the computer (primarily memory, disk storage, processing power, and networking bandwidth) to meet the computing needs of the user. The main issue with the traditional model is related to complexity. It is complex to integrate the operating system and applications with a hardware platform, and complex to support it afterwards.

In one embodiment, a method is provided for automated verification of appliance procedures using a processor device in a computing environment. In one embodiment, by way of example only, a testing configuration is dynamically configured for automatically testing software by adding and/or removing at least one application device from one of the testing configurations for creating a plurality of appliance configurations. Thus, a need for increased efficiency for insuring the hardware and software are properly configured without human intervention.

In one embodiment, by way of example only, the present invention combines unique software and hardware infrastructure to automatically and dynamically create different appliance hardware configurations for rapid verification of appliance application code without human intervention. Fibre channel (FC) switches, serial attached SCSI (SAS) switches, network power switches, and Ethernet switches are installed between the actual components of an appliance. Unique automation code creates configuration mappings for each appliance configuration that resolves which specific configuration aspects must be applied to the FC switches, SAS switches, network power switches, and Ethernet switches in order to automatically build the physical hardware specification of the test bed. Once the desired hardware is automatically configured, the present invention may automatically invoke the application code to execute it's first time configuration procedures and monitor the progress or automatically invoke other supported application level procedures. Several different tests and configurations may be created and verified one right after another in an automated manner. The infrastructure provides an extremely powerful automation test tool that can be applicable to any appliance models that are internal to a user as well as appliances that are provided by $3^{rd}$ party vendors. The present invention enables development programs to create a fully automated test suite to validate all aspects of an appliance with a significant reduction in development resources. The present invention offers an advantage over "simulation" type testing because it uses the real hardware and invokes actual hardware errors in a fully automated manner.

In one embodiment, the present invention provides a solution of automatic software testing of a system such as an appliance that comprises servers, storage, network power switches, and Ethernet switches by dynamically adding and/or removing hardware from the configuration. Once a particular hardware configuration is established by the test automation server, the application code can be invoked and monitored for errors. For example, in one embodiment, the application code performs the logical configuration of the hardware associated with the particular test bed as well as the logical configuration of the application code on top of the hardware. The test automation server can monitor the application code for unexpected errors that arise during the configuration process that the application code performs.

In the event the application code successfully completes the logical configuration of the hardware and software, the test station can initiate host I/O to the system to perform further validation. After the test completes, the test automation may automatically and dynamically configure additional hardware test bed configurations and repeat the process. The test automation can also inject hardware errors by simulating removing a cable or powering off a component that and check that the application code handles the error inject appropriately.

In one embodiment, the present invention provides a solution for product specific attributes to be validated automatically. For example, in one embodiment, by way of example only, the ProtecTIER product supports adding capacity to an existing system, upgrading to a newer server hardware version while keeping the storage configuration in tact, and replacing a server as part of a bare metal restore disaster recovery procedure. Other product specific attributes can be automatically tested using this infrastructure.

In one embodiment, the present invention does not rely on loading different operating systems and application code combinations in succession. In one embodiment, the present invention is able to automatically and dynamically create different hardware test bed configurations in succession, invoke application code to run on the specific hardware configurations and validate the proper behavior of the application code. In one embodiment, the present invention does not require loading different operating systems for each hardware test bed.

Figure 1:
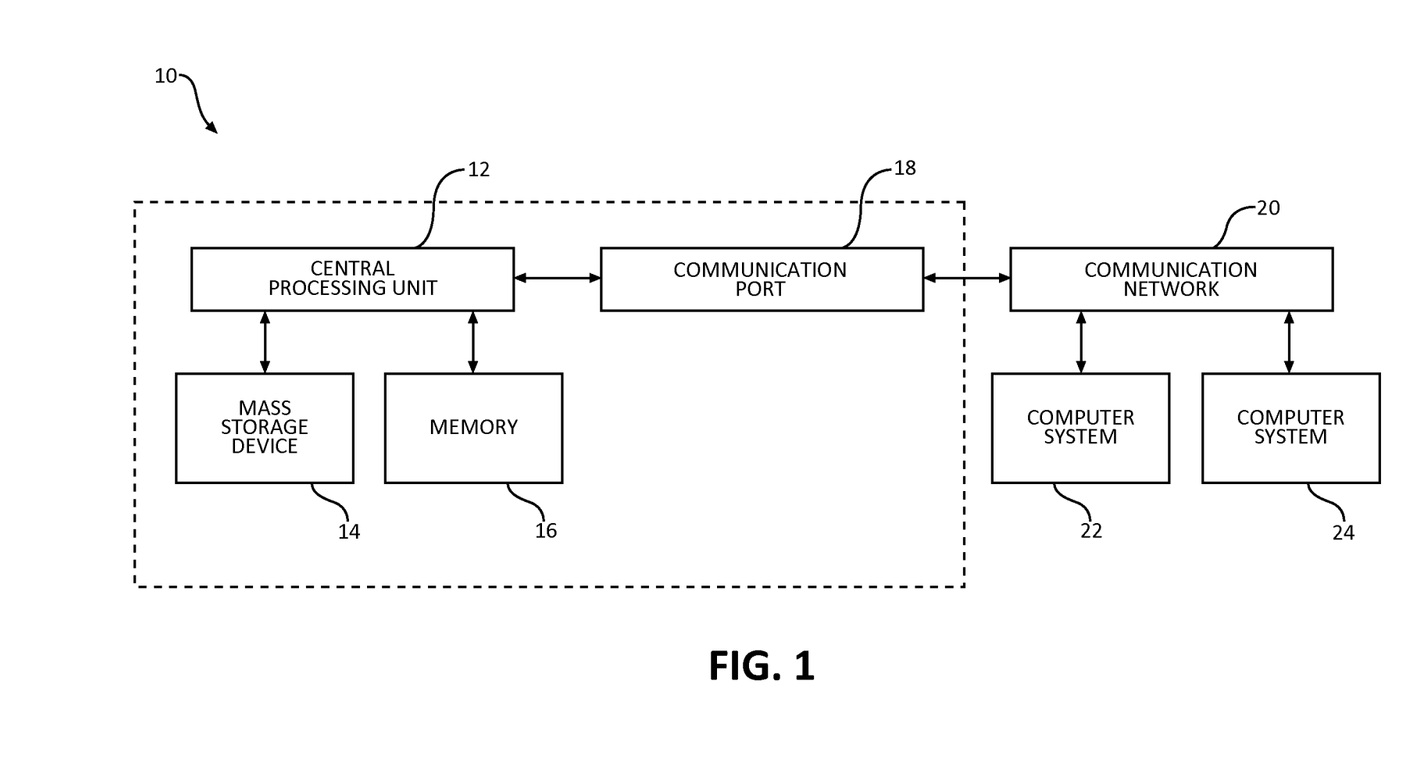
FIG. 1 is a block diagram illustrating a computing system environment having an example computing system/application device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2A:
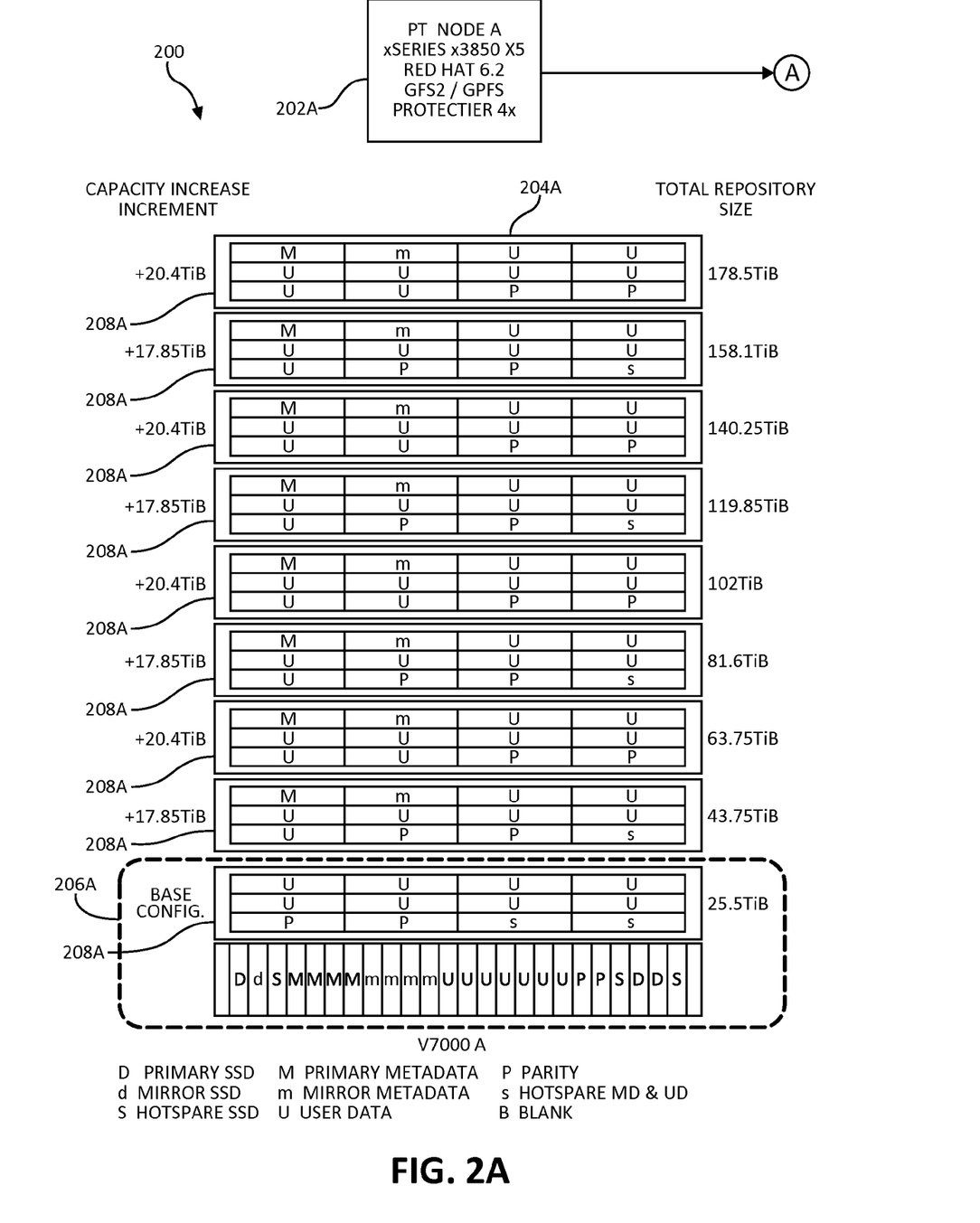
FIG. 2A-B is a block diagram illustrating a hardware structure of an appliance (e.g., IBM System Storage® TS7660 ProtecTIER® deduplication appliance) in a computer system in which aspects of the present invention may be realized.
Figure 2B:
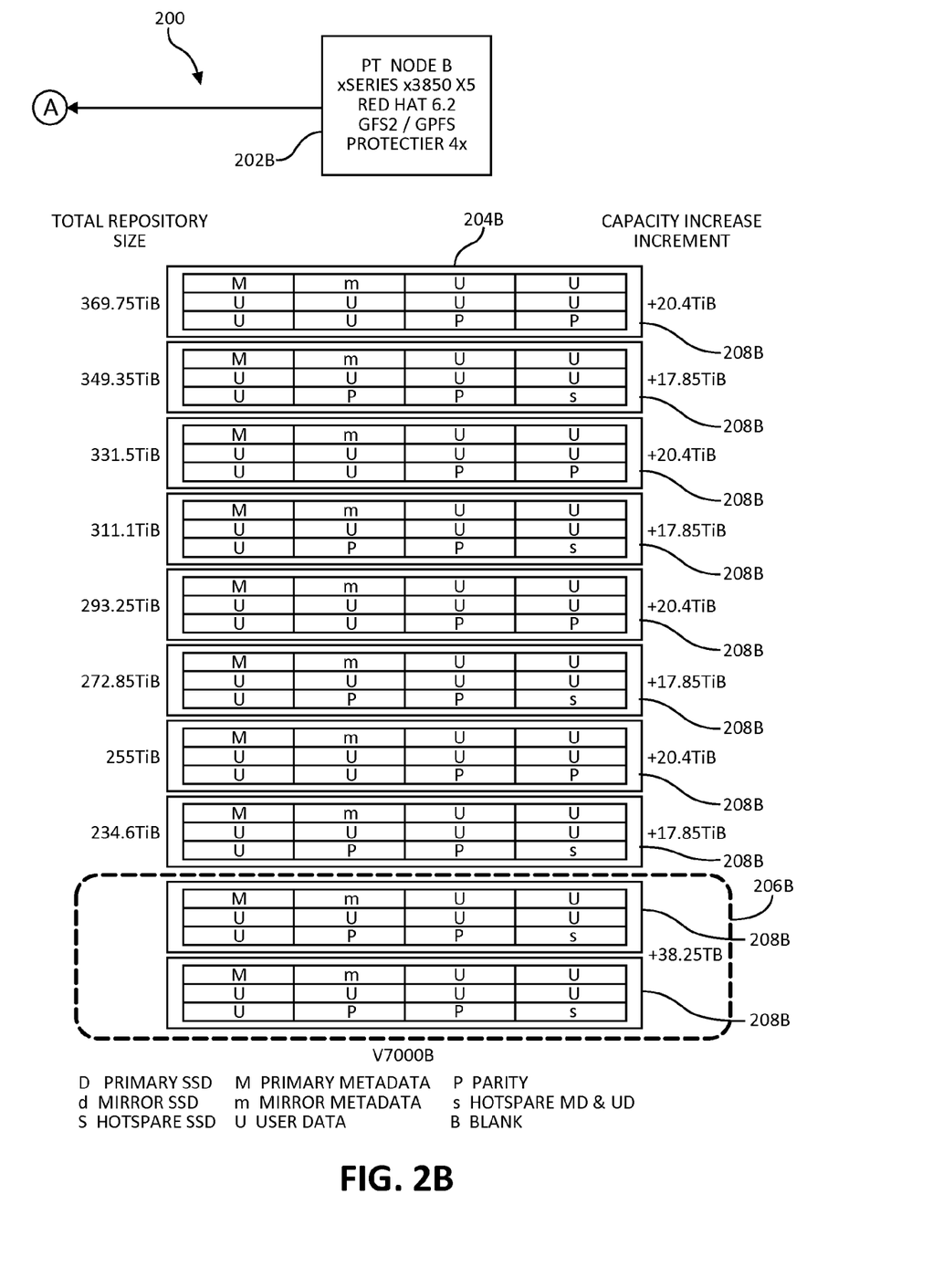

FIG. 2A-B is a block diagram illustrating a hardware structure of an appliance (e.g., IBM System Storage® TS7660 ProtecTIER® deduplication appliance) in a computer system in which aspects of the present invention may be realized. In one embodiment, the appliance type product (e.g., IBM System Storage® TS7660 ProtecTIER® deduplication appliance) 200 contains tight integration between hardware components, firmware, application software, and RAS. For example, in one embodiment, the IBM System Storage® TS7660 ProtecTIER® deduplication appliance 200 is a preconfigured solution of IBM storage and server technologies with ProtecTIER data deduplication software. This IBM System Storage® TS7660 ProtecTIER® deduplication appliance is designed to improve backup and recovery operations by offering not just a bundle of components, but a truly integrated solution that can harness the power of deduplication without making radical changes to the existing environment. The IBM System Storage® TS7660 ProtecTIER® deduplication appliance is available in 18 capacity points designed to meet the disk-based data protection needs of a wide variety of organizations, from mid-sized IT environments to enterprise data centers. Specifically the ProtecTIER TS7660 appliance 200 combines a system with X series of servers (e.g., system X servers) 202 (shown as 202A and 202B with ProtecTIER node A and ProtecTIER node B) running ProtecTIER software attached to V7000 storage 204 (shown as V7000A 204A and V7000B 204B). As illustrated, FIG. 200 shows a primary solid state device (SSD) is indicated with a "D", a mirror SSD is shown with a "d", a hotspare SSD is shown with an "S", primary metadata is shown with an "M", mirror metadata is shown with an "m", user data is shown with a "U", parity is shown with "p", hotspare MD and UD is shown with an "s", and a blank is shown with a "B". FIG. 2 illustrates a base configuration 206A. Additional hardware devices such as Ethernet switches, network power switches, and racks and/or frames comprise the TS7660 appliance 200. The ProtecTIER application software is responsible for managing all aspects of the appliance including automated first time configuration of the system in manufacturing comprising building V7000 RAID groups, volumes, host mappings, loading a Linux OS on the system X servers 202, loading the ProtecTIER application code on the system X server 202, performing logical configuration of the ProtecTIER software (deduplication repository storage, virtualization, input/output (I/O) adapters—Ethernet, FC, etc.), upleveling and/or downleveling firmware and software for all components in the appliance 200, and remote access server (RAS) configuration to monitor hardware and software components. In one embodiment, an initial RAID group of the V7000 200 appliances is configured, loads an operating system software on the V7000 200 appliances, loads the application code, and performs a logical configuration of the software, and detect any failed drives.

In order to provide flexibility for a user, the TS7660 appliance is offered in 18 different capacity points 208 (shown as 9 separate blocks 208A and 208B) layered on top of the base configuration 206A and a TS7660 appliance 200 may be ordered from manufacturing with any of these capacity points, in a fixed configuration, shown in FIG. 2 as the total repository size increases the capacity size increments measured in tebibytes (TiB). Users may upgrade from any capacity point to any capacity point in the field. Increasing the capacity entails configuring the RAID group of a new storage, creating file systems in the new storage, incorporating application code into the storage, and the like. The TS7660 appliance 200 also supports single ProtecTIER server node to dual ProtecTIER server node 202 configuration for all TS7660 capacity points 208A's and 208B's. For each TS7660 appliance capacity point 208 and single node 202 and clustered configuration, as illustrated in FIG. 2 200 using the nodes 202A and 202B, the user can choose between different application interfaces: Virtual Tape Library (VTL), Symantec OpenStorage (OST), Common Internet File System (CIFS), and Network File System (NFS). Finally, users have the option to run with an entry server, which is based off the x3650 M4, and/or with an enterprise server which is based off an x3850 X5.

In one embodiment, the amount of variations to validate via testing operations for such a configuration is very large and consumes many test resources. In addition, it is necessary to test both error paths as well as good paths for each of the permutations. For example, when building an appliance, such as the TS7660 appliance 200, in manufacturing one of the fibre channel cables connecting the system x servers to the storage 200, such as the V7000 storage 200, may not be fully connected, a power supply might not be on, etc. The overall amount of test effort that is required to fully validate such an appliance to ensure robust behavior is substantial and new and innovative methods are required to improve development test and efficiency.

Figure 3:
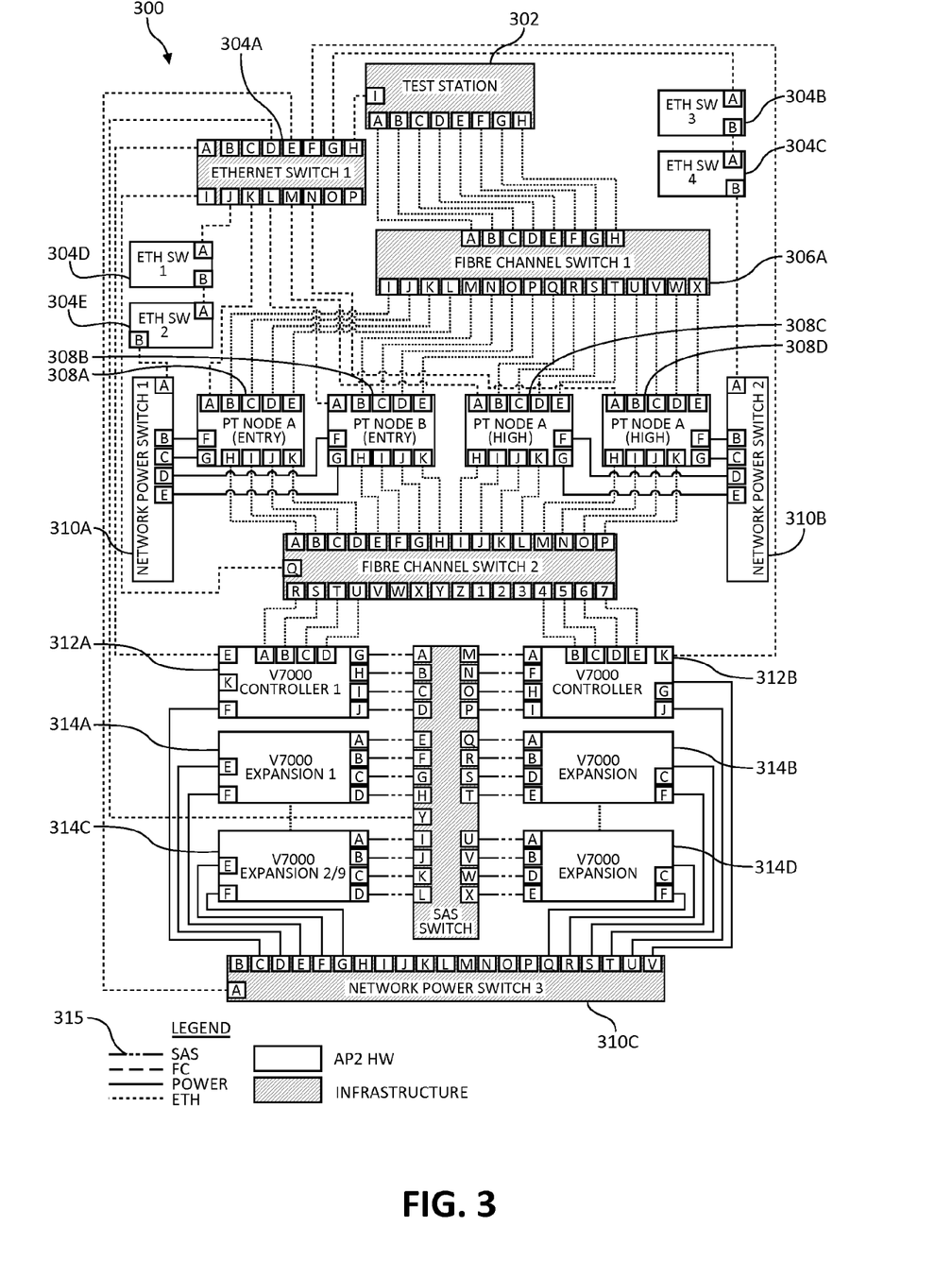
FIG. 3 is a block diagram illustrating an alternative hardware structure for automated verification of appliance procedures in which aspects of the present invention may be realized.

FIG. 3 is a block diagram illustrating an alternative hardware structure 300 for automated verification of appliance procedures in which aspects of the present invention may be realized. Similar to FIG. 2, in FIG. 3 an appliance 300 contains the following hardware components: 1) an entry system x servers (e.g., x3650 M4 based series) that are configured to run the ProtecTIER application software, denoted as PT Node A (Entry) 308A and PT Node B (Entry) 308B in FIG. 3, 2) a Enterprise System x servers (x3850 X5 based) that are configured to run the ProtecTIER application software, denoted as PT Node A (High) 308C and PT Node B (High) 308D, 3) a V7000 storage (See FIG. 2 306), 4) up to two V7000 controllers 312, denoted as V7000 controller 1 312A and V7000 controller 2 312B, 5) nine "9" V7000 expansions 314A-D, behind each V7000 controller denoted as V7000 expansion 1 314A, V7000 expansion 2/9 314C, 6) a RAS/V7000 management switch 325 to allow ProtecTIER software running on system x server to manage and monitor the V7000 (See FIG. 2 306), 7) an internal cluster network to enable clustering between ProtecTIER nodes (note: full connectivity between PT servers and internal network not shown), 8) ethernet switch 1, ethernet switch 2, ethernet switch 3, ethernet switch 4 (with each ethernet switch shown as 304A-D), and 9) a network power switch 1, network power switch 2, and network power switch 3 (with each shown as 310A-C.

In one embodiment, the present invention uses the following hardware as part of the automation infrastructure: 1) a test station 302 which is server that configures the test automation infrastructure, executes commands to the ProtecTIER application code via ssh, issues data path I/O to the configured appliance, and validates the outcome of tests. The ethernet switch 1 304A is used to connect ProtecTIER nodes 308, and infrastructure switches to the test station 302 (e.g., the ethernet switch is used to assist creating the various hardware configuration that are dynamically created for testing). It should be noted that additional ethernet switches 304B, 304C, 304D, and 304E may be used in a designated, internal, and isolated network for the appliance and the ethernet switches are capable of speaking to each other. A fibre channel (FC) switch 1 306A that provides fibre channel connectivity between the test station 302 and the ProtecTIER servers where the PT servers present VTLs over FC to the test station 302. A SAS switch 325 is provide that is used to create the necessary SAS cabling for different V7000 configurations with the PT nodes 308. The network power switch 3 310C provides the ability to power on and off V7000 components for different V7000 configurations.

Using FIG. 3, the present invention performs at least the following types of tests: 1) a first time installation and/or configuration, 2) a ProtecTIER server node upgrade operation, 3) a storage upgrade operation, 4) a ProtecTIER server swap operation, 5) a host I/O, an error injection and verification operation for test types 1-5. The present invention is further explained below in the following use case scenarios. In one embodiment, the test station is able to go to the SAS switch 325 and determine the appropriate SAS zones that are created with the various hardware configuration SAS zones that are desired to be created using the appliance components, such as the V7000, and also, the test station is able to go to the network power switch 3 310C and power on and/or power off the various appliance components, such as the V7000 312, and expansions 314, and 316 according to the configuration desired to be built.

Consider use case 1 that is to build a 25 TB single node entry appliance. A 25 TB single node entry appliance comprises a V7000 controller 312, one V7000 expansion 314 and PT Node A (Entry) 308A. PT Node A (entry) 308A runs the ProtecTIER application software and the V7000 controller 312 and expansion 314 is configured to run the deduplication repository store. In a first configuration, a SAS zone topology (e.g., SAS connectivity with the appliance components and the testing station) that is desired and is created from the test station 302 to the SAS switch 325 to create the following zones: 1) zones a-e and 2) zones b-f. In one embodiment, the present invention powers on the V7000 controller 1 312A and V7000 expansion 1 314A from the test station 302 to network power switch 3 310C to turn on the following power ports: 1) power ports b, c, d, e on the network power switch 3 310C. The zone PT Node A (Entry) 308A to V7000 controller 1—from the test station to fibre channel switch 2 to create the following FC zones: 1) a-r. and 2) b-s from the FC switch 1 306A. The Zone PT Node A (entry) 308A is used to the test station for host I/O from the test station 302 to fibre channel switch 1 306A to create the following FC zones: a-i, b-j, c-k, and d-l using the FC switch 1 306A. In one embodiment, the present invention powers on PT Node A (entry) 308A from the test station 302 to network power switch 1 310A and turns on the following power ports: ports b and c in network power switch 1 310A. From the test station 302, a pre-execution environment (PXE) boot operation is performed on the PT Node A 308A to load Linux OS. From the test station 302, the present invention transfers the application code image to PT Node A (Entry) 308A via the secure copy (scp) or other suitable protocol. From the test station 302, the present invention issues the ProtecTIER commands to configure the TS7660 appliance via the secure shell (ssh) or other suitable protocol to PT Node A (Entry) 308A. From the test station 302, the present invention monitors the progress of the ProtecTIER configuration process. Note this can be achieved via several mechanisms such as scanning the application logs, receiving SNMP traps and/or email alerts, etc. In one embodiment, the present invention configures virtual tape libraries on PT Node A Entry 308A from the test station 302 and issues commands to create a virtual tape libraries that will be presented via the FC to the test server 302. In one embodiment, the present invention, via a backup application and/or via other test tools, I/Os are issued to the TS7660 appliance over the virtual tape libraries being presented on the FC ports. In one embodiment, the present invention monitor the I/O for errors Consider use case 2 that upgrades the 25 TB single node entry appliance 308A to a 25 TB clustered entry appliance. A 25 TB clustered entry appliance contains the same hardware as a 25 TB single node Entry appliance but adds an additional server—PT Node B (Entry) 308B—and also adds an internal cluster network (ethernet switch 1 304A, ethernet switch 2 304E and the network power switch 1 310A. Both server nodes share the same deduplication repository on the V7000 storage and run in an active-active manner. In the case 2 configuration, Zone PT Node B (Entry) 308B is configured to V7000 controller 1 312A from the test station 302 to fibre channel switch 2 306B to create the following FC zones: 1) e-t and 2) f-u both in fibre channel switch 2 306B. In one embodiment, the present invention powers on PT Node B entry 308B from the test station 302 to network power switch 1 310A and turn on the following ports: ports d and e of the PT Node B entry 308B. The Zone PT Node B (entry) 308B is created to the test station for host I/O from the test station 302 to fibre channel switch 1 306A to create the following FC zones: 1) e-m, 2) f-n, 3) g-o, and 4) h-p of the PT Node B entry 308B. From the test station 302, the present invention performs a PXE boot operation on PT Node B 308B to load the Linux OS. From the test station 302, the present invention transfers the PT code image to the PT Node B (Entry) 308B via the scp or another suitable protocol. From the test station 302, the present invention issues the ProtecTIER commands to configure the TS7660 appliance via the ssh or other suitable protocol to PT Node B (Entry) 308B. From the test station 302, the present invention monitors the progress of the ProtecTIER configuration process. In one embodiment, by way of example only, the present invention configures virtual tape libraries on PT Node B Entry 308B from the test station issue ssh commands to create a virtual tape libraries that will be presented via FC to the test server. In one embodiment, by way of example only, the present invention, via a backup application and/or via other test tools, issues I/O to the TS7660 appliance over the virtual tape libraries being presented on the FC ports. In one embodiment, by way of example only, the present invention monitors the I/O for errors.

Consider use case 3 that adds capacity to an TS7660 appliance. This use case adds V7000 expansion 2 314C to the existing configuration in order to increase the size of the deduplication appliance. In order to increase the size of the deduplication appliance the ProtecTIER application code must configure the appropriate RAID groups, volumes, storage pools, and host mappings on the raw storage associated with V7000 expansion 2 314C and then expand the logical deduplication repository on top of the newly available storage. In one embodiment, the configuration of Zone SAS topology is created from test station 302 to the SAS switch 325 to create the following zones: 1) g-i and 2) h-j of the SAS switch 325. In one embodiment, by way of example only, the present invention powers on V7000 expansion 2 314C from the test station 302 to network power switch 3 310C and turns on the following power ports: ports f and g of the network power switch 3 310C. From the test station 302, the present invention initiates the capacity upgrade procedure on PT Node A 308A via SSH. From the test station 302, the present invention monitors the progress of the ProtecTIER configuration process. In one embodiment, the present invention configures virtual tape libraries on PT Node A Entry 308A and PT Node B Entry 308B from the test station 302 and issues ssh commands to create a virtual tape libraries that will be presented via FC to the test server. In one embodiment, the present invention, via a backup application and/or via other test tools, issues I/O to the TS7660 appliance over the virtual tape libraries being presented on the FC ports. In one embodiment, the present invention monitors the I/O for errors. A legend 315 is provided to show the line connections for the SAS, fiber channels (FC), power, and ethernet connections (ETH), and the appliance hardware (white color) and an infrastructure components (shaded in a dark grey).

Figure 4:
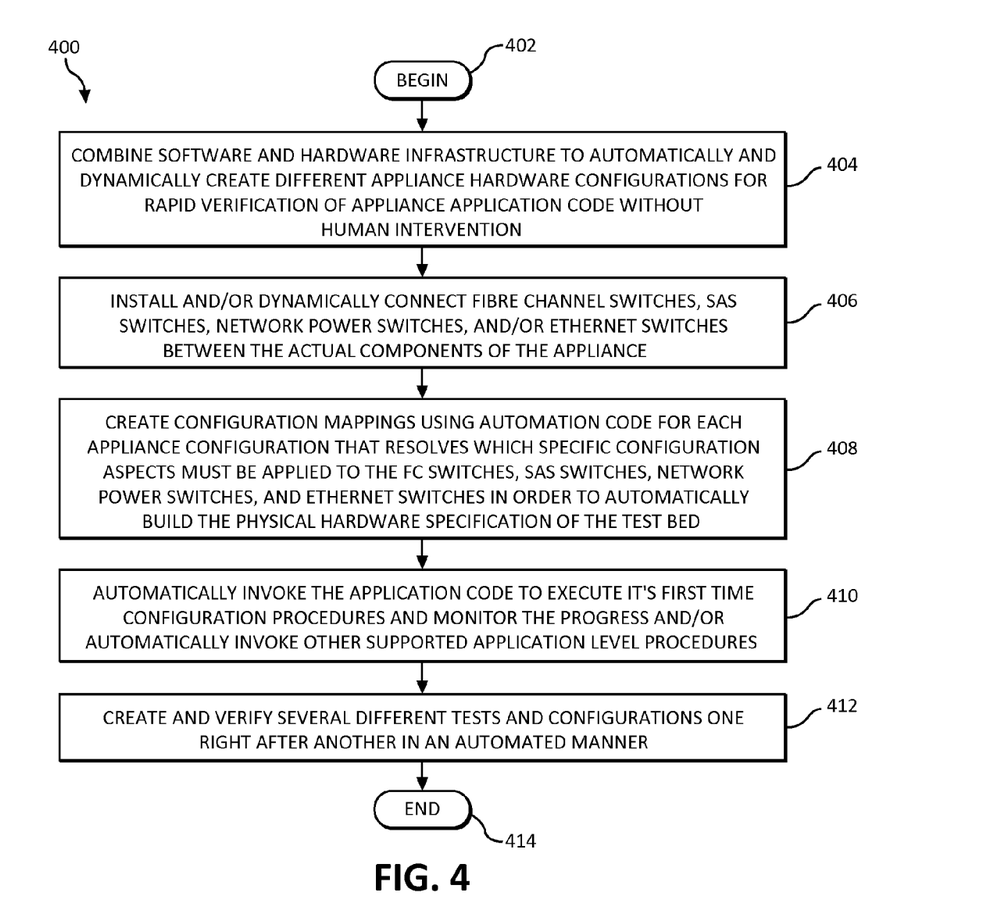
FIG. 4 is a flowchart illustrating an exemplary method for automated verification of appliance procedures in which aspects of the present invention may be realized in which aspects of the present invention may be realized.

Using FIG. 1-3 and turning now to FIG. 4, a flowchart illustrating an exemplary method 400 for automated verification of appliance procedures in which aspects of the present invention may be realized, is depicted. The method 400 begins (step 402). The method 400 combines software and hardware infrastructure to automatically and dynamically create different appliance hardware configurations for rapid verification of appliance application code without human intervention (step 404). The method 400 installs and/or dynamically configures fibre channel switches, SAS switches, network power switches, and/or ethernet switches between the actual components of the appliance (step 406). The method 400 creates configuration mappings using automation code for each appliance configuration that resolves which specific configuration aspects must be applied to the FC switches, SAS switches, network power switches, and ethernet switches in order to automatically build the physical hardware specification of the test bed (step 408). The method 400 automatically invokes the application code to execute its first time configuration procedures and monitor the progress and/or automatically invoke other supported application level procedures (step 410). The method 400 creates and verifies several different tests and configurations one right after another in an automated manner (step 412). The method 400 ends (step 414).

Thus, in one embodiment, the present invention provides a solution for dynamic and automatic software testing of a system which includes hardware such as servers, network switches, ethernet switches etc., by dynamically adding and/or removing hardware from the test configuration. More specifically, present invention dynamically creating different test configurations for a storage system with hardware units, by programmatically powering off some of the units and creating cabling by controlling switches to set up the storage system, load, configure, and test system software.

In one embodiment, the present invention provides for dynamic cabling between appliance devices in the testing configuration by controlling switches in order to set up a storage system. An appliance configuration map is created and/or configured using an application code for creating each of the appliance configurations.

In one embodiment, the present invention, upon configuring the testing configuration, automatically invokes an application code for performing an initial configuration procedures for the testing configuration. The application code performs a logical configuration on the appliance devices. In one embodiment, the present invention monitors the testing configuration, and automatically invokes alternative application level procedures while performing the initial configuration procedures.

In one embodiment, the present invention dynamically configures an alternative testing configurations one after another in automated repetitions. In one embodiment, the present invention uses dynamically configured testing configurations for performing initial configuration and/or installation procedures on one of the appliance configurations, a server upgrade operation, a server swap operation, a host input/output operation (I/O), and an error injections and verifications operations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for automated verification of appliance procedures using a processor device in a computing environment, comprising:

dynamically configuring a testing configuration for automatically testing software by adding at least one of a plurality of application devices to the testing configurations and removing the at least one of the plurality of application devices from the testing configuration for creating a plurality of appliance configurations for configuring a plurality of appliance devices;

creating a cabling between the plurality of appliance devices in the testing configuration by controlling switches in order to set up a storage system;

simulating a removal operation of one of the at least one of a plurality of application devices to the testing configurations by modifying the cabling;

upon configuring the testing configuration, performing:
  automatically invoking an application code for performing initial configuration procedures for the testing configuration, wherein the application code performs a logical configuration on the plurality of appliance devices,
  monitoring the testing configuration, and
  automatically invoking alternative application level procedures while performing the initial configuration procedures; and using dynamically configured testing configurations for one of performing initial configuration and installation procedures on the plurality of appliance configurations, a server upgrade operation, a server swap operation, a host input/output operation (I/O), and an error injections and verifications operations.

2. The method of claim 1, wherein adding and removing the at least one of the plurality of application devices from one of the testing configuration further includes programmatically powering on or off the at least one of the plurality of application devices for loading and testing the testing configuration.

3. The method of claim 1, further including creating an appliance configuration map using an application code for creating each of the plurality of appliance configurations.

4. The method of claim 1, further including dynamically configuring an alternative testing configurations one after another in automated repetitions.

5. A system for automated verification of appliance procedures of a computing environment, the system comprising:

a plurality of appliance devices;

a testing station in communication with the at least one appliance device that dynamically configures testing configurations for the plurality of appliance devices, performing testing operation, executes commands, and validates an outcome of tests in the testing configurations;

a switch for establishing connectivity between the testing station and the plurality of appliance devices; and at least one processor device in communication with the testing station, the plurality of appliance devices, and the switch, wherein the at least one processor device:

dynamically configures a testing configuration for automatically testing software by adding at least one of the plurality of application devices to the testing configuration and removing the at least one of the plurality of application devices from the testing configuration for creating a plurality of appliance configurations for configuring a plurality of appliance devices, creates cabling between the plurality of appliance devices and the testing configurations in order to set up a storage system, simulates a removal operation of one of the at least one of a plurality of application devices to the testing configurations by modifying the cabling, upon configuring the testing configuration, performs:
  automatically invoking an application code for performing initial configuration procedures for the testing configuration, wherein the application code performs a logical configuration on the plurality of appliance devices,
  monitoring the testing configuration, and
  automatically invoking alternative application level procedures while performing the initial configuration procedures, and uses dynamically configured testing configurations for one of performing initial configuration and installation procedures on the plurality of appliance configurations, a server upgrade operation, a server swap operation, a host input/output operation (I/O), and an error injections and verifications operations.

6. The system of claim 5, wherein adding or removing the plurality of appliance devices from the testing configuration further includes a power switch operable by the at least one processor device that programmatically powers on or off the at least one of the plurality of appliance devices for loading and testing the testing configuration.

7. The system of claim 5, wherein the at least one processor device creates an appliance configuration map using an application code for creating each of the plurality of appliance configurations.

8. The system of claim 5, wherein the at least one processor device dynamically configures an alternative testing configuration for one of the plurality of appliance configurations one after another in automated repetitions.

9. A computer program product for automated verification of appliance procedures using a processor device in a computing environment, the computer program product comprising a non-transitory computer-readable storage medium having computer-readable program code portions stored therein, the computer-readable program code portions comprising:

a first executable portion that dynamically configuring a testing configuration for automatically testing software by adding at least one of a plurality of application devices to the testing configuration and removing the at least one of the plurality of application devices from the testing configuration for creating a plurality of appliance configurations for configuring a plurality of appliance devices;

a second executable portion that creates a cabling between the plurality of appliance devices in the testing configuration by controlling switches in order to set up a storage system;

a third executable portion that simulates a removal operation of one of the at least one of a plurality of application devices to the testing configurations by modifying the cabling;

a fourth executable portion that, upon configuring the testing configuration, performs:
- automatically invoking an application code for performing initial configuration procedures for the testing configuration, wherein the application code performs a logical configuration on the plurality of appliance devices,
- monitoring the testing configuration, and
- automatically invoking alternative application level procedures while performing the initial configuration procedures; and a fifth executable portion that uses dynamically configured testing configurations for one of performing initial configuration and installation procedures on the plurality of appliance configurations, a server upgrade operation, a server swap operation, a host input/output operation (I/O), and an error injections and verifications operations.

10. The computer program product of claim 9, wherein adding or removing the at least one of the plurality of appliance devices from one of the testing configuration further includes a fifth executable portion that programmatically powers on or off the at least one hardware device for loading and testing the testing configuration.

11. The computer program product of claim 9, further including a fifth executable portion that creates an appliance configuration map using an application code for creating each of the plurality of appliance configurations.

12. The computer program product of claim 9, further including a sixth executable portion that
dynamically configures an alternative testing configurations one after another in automated repetitions.

* * * * *